(12) United States Patent
Psaltis

(10) Patent No.: US 6,934,060 B2
(45) Date of Patent: Aug. 23, 2005

(54) HOLOGRAPHIC FILTERS FOR SPECTROSCOPIC IDENTIFICATION OF SUBSTANCES

(75) Inventor: Demetri Psaltis, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 38 days.

(21) Appl. No.: 10/627,008

(22) Filed: Jul. 25, 2003

(65) Prior Publication Data

US 2004/0021920 A1 Feb. 5, 2004

Related U.S. Application Data

(60) Provisional application No. 60/398,816, filed on Jul. 25, 2002.

(51) Int. Cl.[7] .................................................. G02B 5/32
(52) U.S. Cl. ........................................ 359/15; 356/301
(58) Field of Search ..................... 359/15, 24; 356/301, 356/305, 311, 328, 451, 457

(56) References Cited

U.S. PATENT DOCUMENTS

| | | | | | |
|---|---|---|---|---|---|
| 5,198,911 A | * | 3/1993 | Ning | ............................... | 359/3 |
| 5,221,957 A | * | 6/1993 | Jannson et al. | .............. | 356/301 |
| 6,538,775 B1 | * | 3/2003 | Bowley et al. | ................ | 359/3 |
| 2002/0196486 A1 | * | 12/2002 | Ingwall et al. | ................ | 359/15 |

* cited by examiner

*Primary Examiner*—Mark A. Robinson
*Assistant Examiner*—Alessandro Amari
(74) *Attorney, Agent, or Firm*—Gates & Cooper LLP

(57) ABSTRACT

A method, system, and apparatus provide for the creation and use of a holographic filter. The holographic filter has multiple superpositioned holograms within a volume holographic medium. These superpositioned holograms synthesize a filter shape with multiple peaks at specified positions. The shape of the holographic filter matches a spectrum of a substance. The holographic filter may then be used (e.g., in a spectrometer) to simultaneously detect peaks in the spectrum of the matching substance.

21 Claims, 5 Drawing Sheets

HOLOGRAPHIC FILTERS FOR SPECTROSCOPIC IDENTIFICATION OF SUBSTANCES

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/398,816, filed on Jul. 25, 2002, by Demetri Psaltis, entitled "HOLOGRAPHIC FILTERS FOR SPECTROSCOPIC IDENTIFICATION OF SUBSTANCES."

STATEMENT REGARDING FEDERALLY SPONSORED RESEARCH AND DEVELOPMENT

The invention was made with Government support under Grant No.MDA 972-00-1-0019 awarded by DARPA, and Grant No. EEC9402726 awarded by the National Science Foundation. The Government has certain rights in this invention.

BACKGROUND OF THE INVENTION

1. Field of the Invention

The present invention relates generally to identifying substances (gases, liquids, or solids), and in particular, to using a holographic filter in a detection apparatus to detect a particular substance.

2. Description of the Related Art

Spectroscopy (such as infrared absorption spectroscopy [IR], or Raman spectroscopy) is a method often used to detect and identify substances (e.g., gases, liquids, or solids) such as toxic or explosive materials. To identify an unknown substance, the spectra (e.g., the wavelength and intensity) of light (that has been absorbed, emitted, or scattered) from the molecules of the unknown substance are measured. In this regard, the spectra of light provide a "fingerprint" that can be used to identify the molecules. Filters may also be used to separate different parts of the spectra by absorbing or reflecting certain wavelengths and transmitting other wavelengths. However, prior art spectroscopy and spectroscopic filters may not provide sufficient sensitivity for detecting a particular substance. These problems may be better understood by describing prior art spectroscopy and filters.

Spectroscopy utilizes the absorption, emission, or scattering of electromagnetic radiation by atoms or molecules (or atomic or molecular icons) to qualitatively or quantitatively study the atoms or molecules, or to study physical processes. To measure spectral reflectance, a variety of different types of spectrometers may be used. In this regard, spectrometers often record a spectrum on a detector at a focal plane after a light ray/beam proceeds through a series of lenses, apertures, stops, and diffraction gratings.

For example, a light source may initially be condensed and passed through an aperture and/or a collimating lens. A dispersing or diffracting element processes the light for collector optics (e.g., an imaging lens) that focus the light/spectrum onto a detector within a focal plane where the light may be recorded for subsequent processing (e.g., using a computer). Alternatively, the light beam may be processed through a collimating lens after which a beam splitter splits the light beam into multiple beams. Mirrors may then be utilized in combination with an imaging lens to project the beam onto a detector in the focal plane where the beam may be recorded. Thereafter, the information recorded on the detector may be obtained (e.g., transmitted or retrieved) by a computer for detailed analysis. An example of such a spectrometer is a Michelson interferometer.

To more accurately identify a substance, one or more filters may be used to transmit or reflect a specified range of wavelength. In this regard, the filter may be utilized with the imaging lens so that only desired wavelengths are recorded on the detector.

FIG. 1 illustrates the use of a Michelson interferometer and a filter in the prior art. As illustrated, a substance is illuminated with light at a point source 102 and is condensed using a condenser lens 104. The condensed light may then pass through slit 106 after which it is collimated using collimator lens 108. A beam splitter 110 is used to split the collimated light beam into two beams. One beam is reflected by the beamsplitter 110 to a plane fixed mirror 112. The other beam is reflected at 90 degrees to a movable plane mirror 114.

Both mirrors 112 and 114 reflect their respective beams back to the beamsplitter 110 and strike the beamsplitter 110 at the original incident beam's position. The beamsplitter 110 reflects the two beams to filter 116 where certain spectra may be filtered. The filtered light may then be focused using image-formation lens 118. The focusing lens 118 focuses the filtered light to provide an interference pattern at the focal plane where a detector 120 may be used to record the interference pattern. The interference pattern on the detector 120 may then be processed/analyzed using a computer to identify and detect the substance.

While the interferometer of FIG. 1 (and other interferometers or spectrometers) may be used to identify substances, it is often desirable to find ways to more accurately filter or more easily identify a substance. However, prior art methods and filters used for identifying substances may have a limited dynamic range among other disadvantages.

SUMMARY OF THE INVENTION

Using spectroscopy (e.g., IR or Raman spectroscopy) various substances (e.g., gases, liquids, or solids) may be detected and identified. The ability to identify/detect molecules of a substance is found in the detailed absorption or emission spectra of the molecules. For example, a spectra of a substance may contain multiple emission or absorption peaks.

One or more embodiments of the invention provide for the creation and use of a holographic filter whose filter shape can be constructed to precisely match the spectra of a given substance. To provide such a filter shape, multiple holograms are multiplexed/superpositioned and recorded in the holographic filter.

When the filter is inserted in the detection apparatus, it provides enhanced sensitivity for detecting the particular substance for which the holographic filter has been tailored. In this regard, the filter (and the particular shape of the filter) may be used to simultaneously separate and detect the multiple peaks of the spectra of the substance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a method, apparatus, and article of manufacture for creating and using a holographic filter whose filter shape can be constructed to precisely match the spectrum of a given substance. When the holographic filter is inserted in a detection apparatus (e.g., a spectrometer), the filter provides enhanced sensitivity for detecting the particular substance for which the holographic filter has been tailored.

Holographic Filter Creation

Although filters have been used in the prior art to assist in the identification of substances, principles of volume holography have not been effectively utilized to efficiently and accurately detect and identify complex substances.

Figure 1:
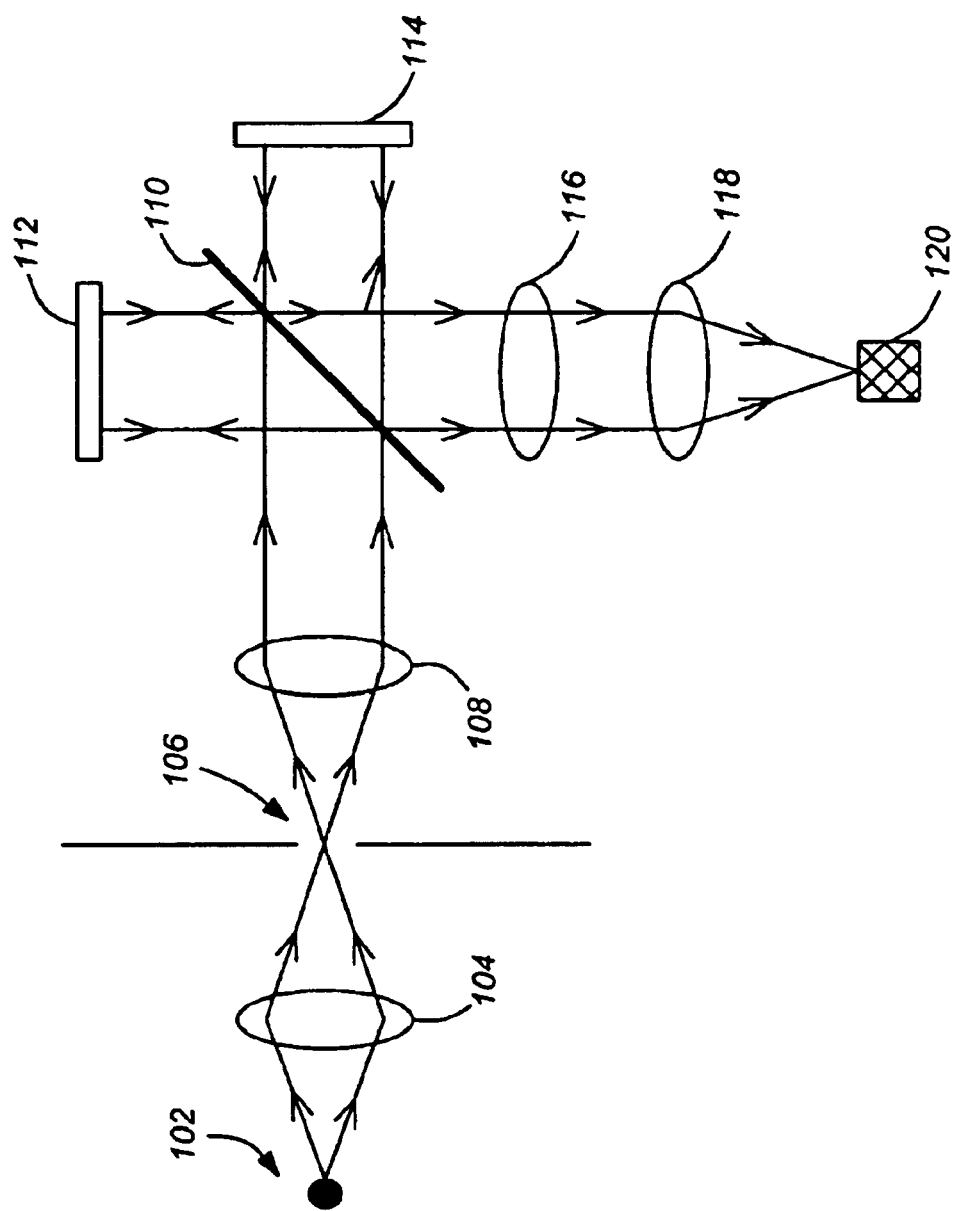
FIG. 1 illustrates the use of a Michelson interferometer and a filter in the prior art.
Figure 2:
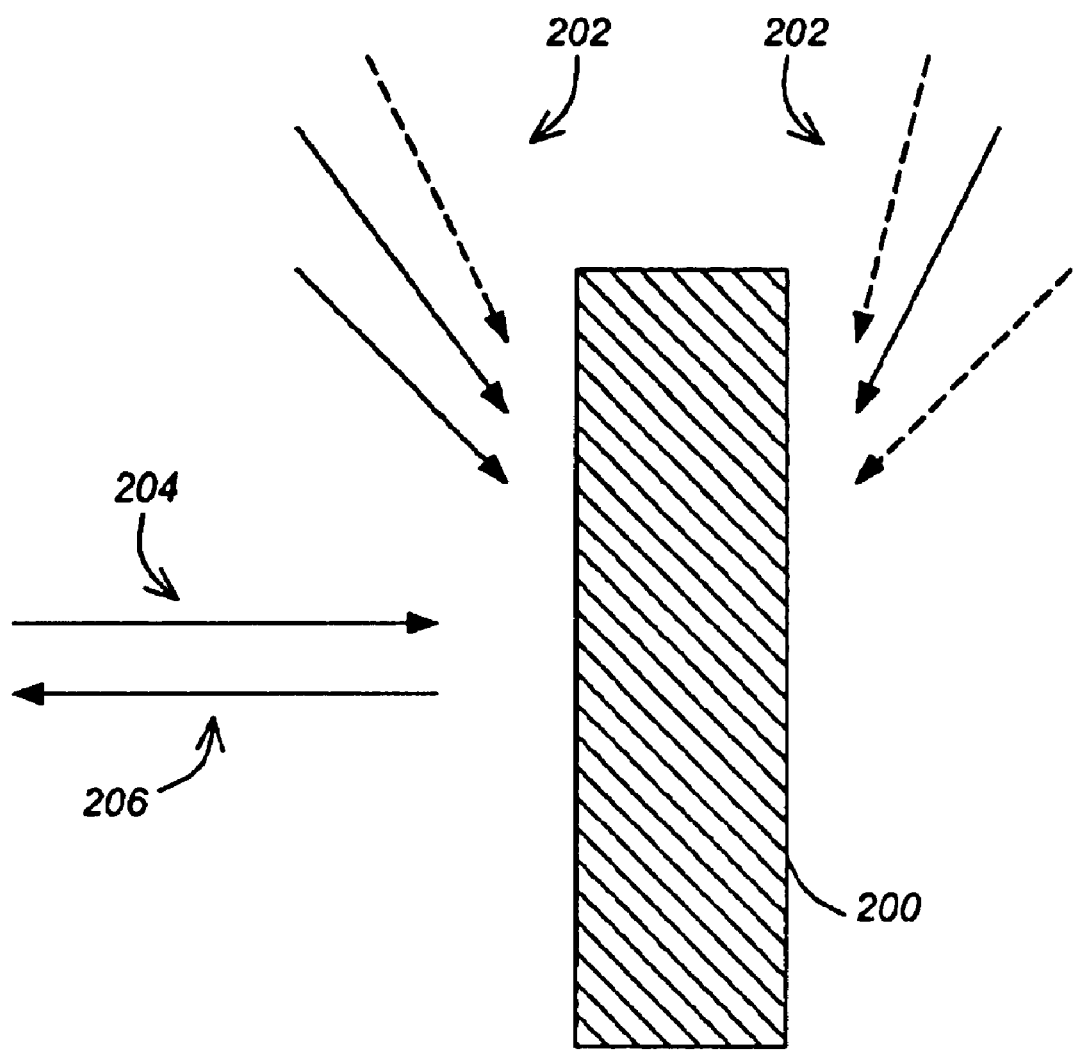
FIG. 2 illustrates a general architecture for recording and using a filter with prescribed filtering characteristics in accordance with one or more embodiments of the invention.

FIG. 2 illustrates a general architecture for recording and using a filter with prescribed filtering characteristics. A grating is recorded inside a recording medium 200 by interfering two mutually coherent recording beams 202. The recorded grating is illuminated with another beam 204 that may not necessarily be at the same angle as either of the two recording beams 202. When illuminated, a portion of the light from the illuminating beam 204 is scattered (reflected) 206.

Figure 3:
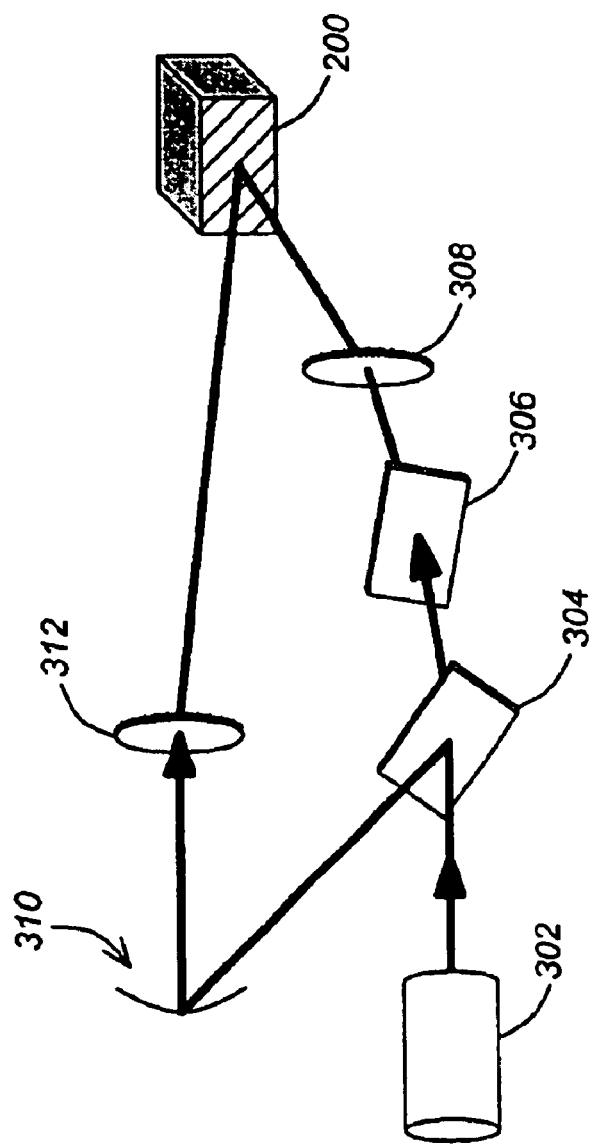
FIG. 3 illustrates further details regarding the recordation of a grating inside a recording medium in accordance with one or more embodiments of the invention.

FIG. 3 illustrates further details regarding the recordation of a grating inside the recording medium 200 in accordance with one or more embodiments of the invention. When a laser 302 is fired, a beam splitter 304 is utilized to create two beams. One beam, referred to as the object or signal beam/wavefront travels through a spatial light modulator (SLM) 306 that shows pages of raw binary data as clear and dark boxes. The information from the page of binary code is focused using relay optics 308 (also referred to as a focusing/imaging lens) and carried by the signal beam to a recording medium 200 (such as a light-sensitive lithium-niobate crystal 200 or any other holographic material such as a photopolymer in place of the crystal).

The second beam (produced by the beam splitter 304), called the reference beam, proceeds through a separate path (e.g., via mirror 310 and relay optics/imaging lens 312) to the crystal 200. When the two beams meet, the interference pattern that is created stores the data carried by the signal beam in a specific area in the crystal 200 as a hologram (also referred to as a holographic grating).

Depending on the angle of the reference beam used to store the data, various pages of data may be stored in the same area of the crystal 200. In traditional data storage techniques, to retrieve data stored in the crystal 200, the reference beam is projected into the crystal 200 at exactly the same angle at which it entered to store that page of data. If the reference beam is not projected at exactly the same angle, the page retrieval may fail. The beam is diffracted by the crystal 200 thereby allowing the recreation of the page that was stored at the particular location. The recreated page may then be projected onto a charge-coupled device (e.g., CCD camera), that may interpret and forward the data to a computer.

Bragg's law determines that the diffracted light intensity is significant only when the diffracted light is spatially coherent and constructively in phase. Bragg's law is often used to explain the interference pattern of beams scattered by crystals. Due to the highly spatial and wavelength Bragg selectivity of a crystal, a large number of holograms can be stored and read out selectively in the same volume. Accordingly, there is a potential for one bit per wavelength cube data storage volume density and intrinsic parallelism of data accessing up to Mbytes per hologram.

The above-described properties also make a volume hologram a powerful tool for optical information processing. For example, a complex signal wavefront may be extracted and processed by one or multiple holograms as a color and spatial filter in confocal microscopes (see e.g., G. Barbastathis, M. Balberg, and D. J. Brady, "Confocal microscopy with a volume holographic filter," Opt. Lett., vol. 24, no. 12, pp.811–813, 1999 [which is incorporated by reference herein]). In another example, an element may be directly imaged for 3-D spatial and color information (see e.g., G. Barbastathis and D. J. Brady, "Multidimensional tomographic imaging using volume holography," Proc. IEEE, vol. 87, no. 12, pp. 2098–2120, 1999; and G. G. Yang, H. S. Chen, and E. N. Leith, "Volume reflection holographic confocal imaging," Appl. Opt., vol. 39, no. 23, pp. 4076–4079, 2000 [which articles are incorporated by reference herein]).

Optical information processing may be different from a data storage application where information is recorded inside the medium 200 as complex holographic gratings. For imaging applications, simple pre-designed strong volume holograms may be recorded to process information from unknown complex incident wavefronts. The extremely spatial and color selectivity of Bragg matching in volume holograms makes it possible to selectively extract specific information from the input, and project them into one or multiple detectors. However, the prior art has not effectively and efficiently utilized volume holographs as a filter in a desirable manner.

Referring again to FIG. 2, subsequent to illumination, the reflected light 206 may contain only the portion of the illuminating beam 204 that is at a spectral band whose center can be controlled by the angle between the two recording beams 202 (i.e., the signal beam and reference beam as described above). In other words, the angle between the two recording beams 202 controls which spectral bands are reflected 206 by the holographic filter 200.

The amplitude of the filtering action of the hologram may be determined by the strength of the grating. In this regard, the strength of the grating may be controlled by the exposure time during hologram formation. Additionally, the spectral width of the filter 200 (i.e., the amount of the electromagnetic spectrum the filter controls) can be controlled by either the amplitude of the index modulation (strong grating regime) or the effective hologram thickness (weak grating regime). A holographic filter 200 constructed as described above, may have a peaked response around a specific wavelength. Such a peaked response provides the ability to efficiently filter the desired wavelengths.

The above-described holographic filters 200 maintain the ability to filter a specific wavelength within a spectra. Such particular filtering may provide the ability to more easily identify simple substances (and/or the content of simple substances). However, alternative substances (that may or may not be more complex) may be more difficult to identify and the above-described filters may not provide sufficient detection/identification capabilities. For example, such filters may not have a desired sensitivity and measurements may be slow. In this regard, the identification of molecules may be found in the detailed absorption or emission spectra. Further, a particular spectra (referred to herein as a complex spectra) may have multiple emission or absorption peaks. Accordingly, one or more embodiments of the invention provide a filter that may be used to identify/detect such a complex spectra. Further, the filter may enable the detection of such multiple emission or absorption spectral lines of the given substance simultaneously.

To record a filter with such capabilities, embodiments of the invention may take advantage of the Bragg selectivity and multiplexing ability of volume holograms. In this regard, multiple holograms may be superpositioned, superimposed, or multiplexed to synthesize a general filter 200 shape with multiple peaks at specified positions and with specified relative strengths and widths. Accordingly, the filter 200 shape provides a wavelength selectivity curve (spectral response curve) that is matched precisely to the absorption/emission spectrum of a given substance.

To multiplex the holograms in a recording medium 200, a special recording exposure schedule may be carefully designed such that the strength and spectral bandwidth of individual holograms are matched precisely to those of the corresponding peak in the spectrum. With multiple peaks detected simultaneously, detection sensitivity and speed may be increased greatly compared with traditional methods. Further, the required data volume may decrease by several orders of magnitude, thereby enhancing the usability by remote sensing applications.

To superposition multiple holograms, multiple pairs of reference/recording beams 202 may be introduced either in sequence or simultaneously. When the recording/reference beams 202 are introduced in sequence, the holographic filter 200 is enabled with a desired spectral filtering function (i.e. having a desired spectral response). For example, the complex spectra may be broken up into a sequence of peaks of varying amplitude and width. A separate grating within the holographic filter 200 is recorded for each of the peaks by sequentially using multiple pairs of recording beams 202. To record such peaks, mirrors (e.g., mirror 310) may be rotated after each hologram recording while ensuring that the recording beams 202 overlap at the same position inside the medium 200.

Similar to the holographic filters 200 containing a single hologram (as described above), the spectral center of each grating (in a holographic filter with multiple multiplexed holograms) may be determined by the incident angles of the two recording beams 202. The strength of each grating may be controlled by the exposure time during hologram formation. Further, the spectral bandwidth of each grating can be controlled by either the amplitude of the index modulation (strong grating regime) or the effective hologram thickness (weak grating regime). A filter 200 constructed in this manner may have a spectral response with multiple peaks at specified positions and with specified relative strengths and widths.

Once the holographic filter 200 has been created/recorded to match a particular spectrum of a given substance, the filter 200 may be inserted into a detection apparatus such as a spectrometer. As described above, a holographic filter 200 that is constructed using multiple recording beams 202 (either sequentially or simultaneously) is particularly well suited for detecting multiple emission or absorption spectral lines for a given substance simultaneously.

Figure 4A:
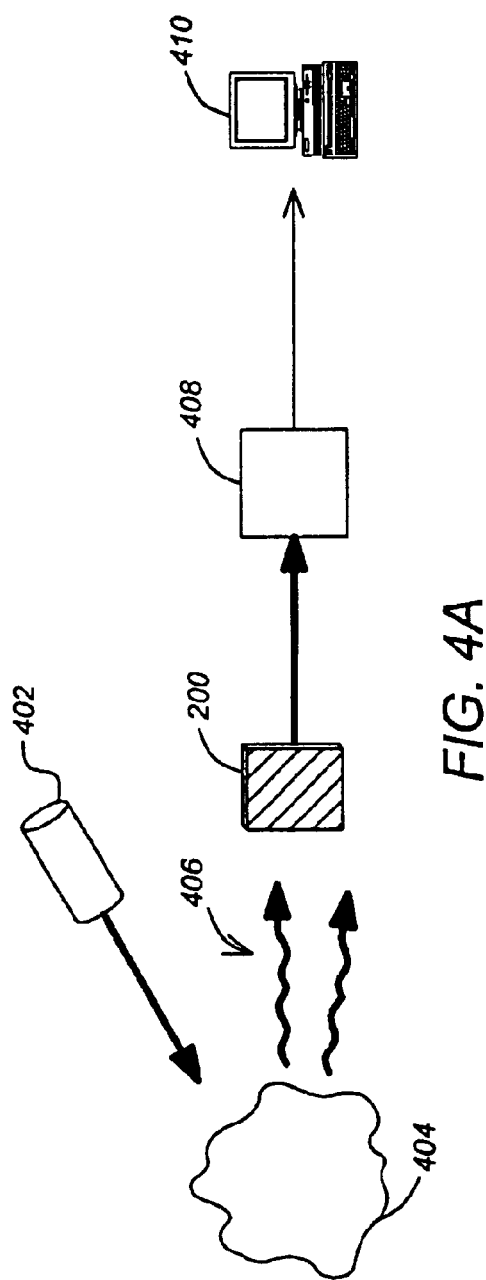
FIG. 4A illustrates a Raman spectroscopy apparatus using a holographic filter in accordance with one or more embodiments of the invention.

FIG. 4A illustrates a Raman spectroscopy apparatus using the holographic filter 200 in accordance with one or more embodiments of the invention. Similar apparatus may also be used for absorption spectroscopy as well. A pump laser 402 is directed towards a substance 404 to be analyzed. The Raman emission/scattering 406 is then processed by the holographic filter 200. The holographic filter 200 separates the desired portion of the spectra from the non-desirable portion of the spectra (e.g., noise). Thus, using a holographic filter 200 having multiple multiplexed holograms (as described above), the filter 200 allows a spectra having multiple emission/absorption peaks to pass through while simultaneously filtering out non-desirable spectra.

Figure 4B:
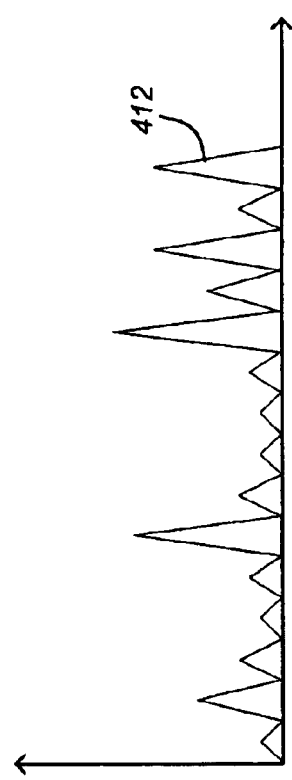
FIG. 4B illustrates a chart of an example spectrum to be filtered in accordance with one or more embodiments of the invention.

FIG. 4B illustrates a chart of the spectrum 412 to be filtered. As described above, the filter 200 is recorded with multiple gratings having peaks that exactly match the spectrum 412. When the Raman scattering 406 is processed through the filter 200, the spectrum 412 is allowed to pass through the filter 200 after which it is recorded by detector 408 (e.g., a CCD—charge coupled device). The information recorded on detector 408 may then be processed by a computer 410 for further analysis. As described herein, the filter 200 allows a spectrum 412 having multiple peaks to pass through simultaneously rather than using multiple filters 200 or complex and time-consuming calculations. Such capabilities allow the recordation on the detector of a particular spectrum having multiple absorption/emission peaks simultaneously. The filter 200 is therefore particularly useful in detecting the presence of a particular substance having multiple absorption/emission spectral lines.

Logical Flow

Figure 5:
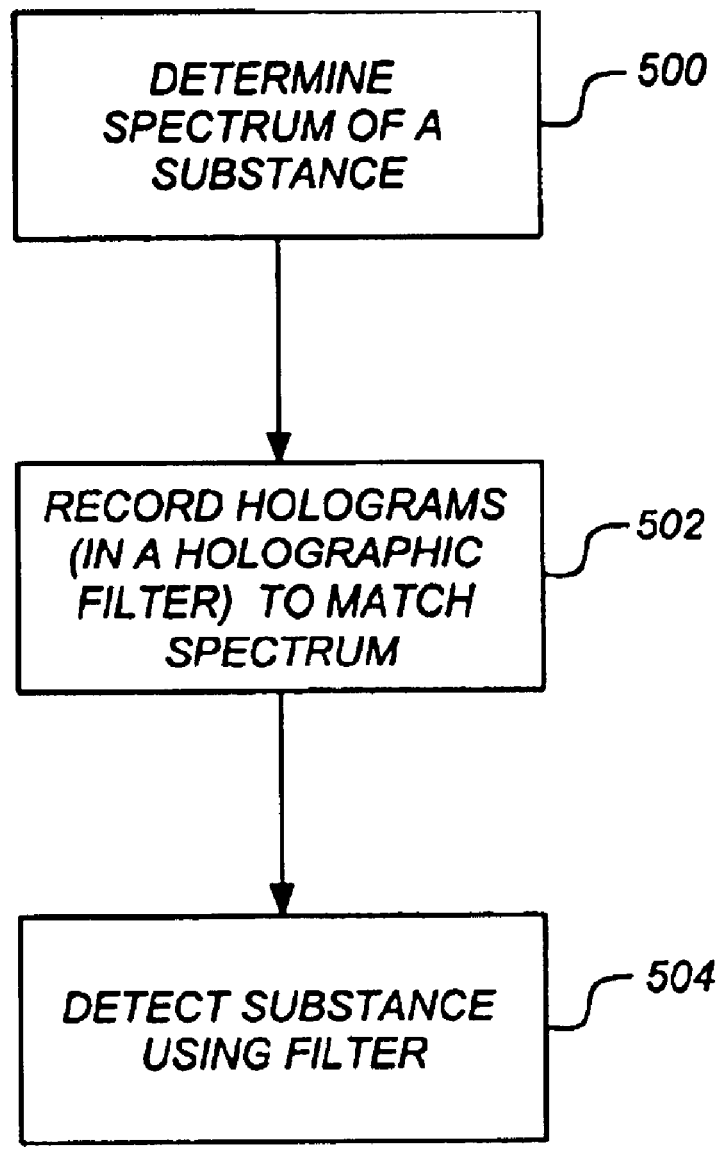
FIG. 5 is a flow chart that illustrates the creation and use of a holographic filter in accordance with one or more embodiments of the invention.

FIG. 5 is a flow chart that illustrates the creation and use of the holographic filter 200 in accordance with one or more embodiments of the invention. At step 500, the spectrum of a desired substance is determined. Such a spectrum may have multiple absorption (or emission) spectral lines/peaks.

At step 502, multiple superpositioned/multiplexed holograms are recorded within a volume holographic medium. The superpositioned holograms synthesize a filter shape with multiple peaks at specified positions that match the spectrum of the substance. In this regard, the multiple peaks have specified relative strengths and widths.

The recording of the holograms may be completed by introducing multiple pairs of reference beams in the volume holographic medium either simultaneously or sequentially. If the reference beams are introduced sequentially, the sequential introduction provides a desired spatial filtering function for the spectrum of the substance. In this regard, the spectrum may be broken up into a sequence of peaks of varying amplitude and width. A separate grating may then be recorded in the volume holographic medium for each of the peaks.

Once the superpositioned holograms have been recorded, the volume holographic medium is used as a filter (e.g., in a spectroscopy apparatus) to detect the substance. In this regard, the filter has the capability to simultaneously detect the multiple peaks of the spectra and thereby filters out the desired spectra (e.g., for later evaluation/analysis by a computer).

CONCLUSION

This concludes the description of the preferred embodiment of the invention. The following describes some alternative embodiments for accomplishing the present invention. For example, any type of spectroscopy apparatus may be used consistently and within the scope of the present invention. Further, any type of volume holographic medium may be used to store the multiplexed holograms (e.g., a light-sensitive lithium-niobate crystal or a photopolymer in place of the crystal).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A holographic filter comprising multiple superpositioned holograms within a volume holographic medium wherein:
    the multiple superpositioned holograms synthesize a filter shape with multiple peaks at specified positions;
    the filter shape precisely marches a spectrum of a substance; and
    the holographic filter is used to detect the substance by allowing the spectrum matching the multiple peaks to pass through the filter simultaneously onto a detector.

2. The holographic filter of claim 1, wherein the multiple peaks have specified relative strengths and widths.

3. The holographic filter of claim 1, wherein the holographic filter is capable of detecting the substance by simultaneously detecting the multiple peaks of the spectrum of the substance.

4. The holographic filter of claim 1, wherein the multiple superpositioned holograms are recorded using multiple pairs of reference beams that are introduced in the volume holographic medium simultaneously.

5. The holographic filter of claim 1, wherein the multiple superpositioned holograms are recorded using multiple pairs of reference beams that are introduced in the volume holographic medium sequentially.

6. The holographic filter of claim 5, wherein:
    the sequential introduction provides a desired spectral filtering function for the spectrum of the substance;
    the spectrum of the substance is broken into a sequence of peaks of varying amplitude and width; and
    a separate grating is recorded in the volume holographic medium for each of the peaks.

7. The holographic filter of claim 1, further comprising a spectroscopy apparatus configured to use the holographic filter to detect the substance.

8. A method for filtering a spectra comprising:
    determining a spectrum of a substance;
    recording multiple superpositioned holograms within a volume holographic medium to synthesize a filter shape with multiple peaks at specified positions that precisely matches the spectrum of the substance; and
    detecting the substance using the volume holographic medium as a filter by allowing the spectrum matching the multiple peaks through the filter simultaneously onto a detector.

9. The method of claim 8, wherein the multiple peaks have specified relative strengths and widths.

10. The method of claim 8, wherein the detecting step comprises simultaneously detecting the multiple peaks of the spectrum of the substance.

11. The method of claim 8, wherein the recording step comprises simultaneously introducing multiple pairs of reference beams in the volume holographic medium.

12. The method of claim 8, wherein the recording step comprises sequentially introducing multiple pairs of reference beams in the volume holographic medium.

13. The method of claim 12, wherein the sequentially introducing comprises:
    providing a desired spectral filtering function for the spectrum of the substance;
    breaking upon the spectrum of the substance into a sequence of peaks of varying amplitude and width; and
    recording a separate grating in the volume holographic medium for each of the peaks.

14. The method of claim 8, wherein the volume holographic medium is used as a filter in a spectroscopy apparatus.

15. An apparatus for filtering a spectra comprising:
    means for determining a spectrum of a substance;
    means for recording multiple superpositioned holograms within a volume holographic medium to synthesize a filter shape with multiple peaks at specified positions that precisely matches the spectrum of the substance; and
    means for detecting the substance using the volume holographic medium as a filter by allowing the spectrum matching the multiple peaks to pass through the filter simultaneously onto a detector.

16. The apparatus of claim 15, wherein the multiple peaks have specified relative strengths and widths.

17. The apparatus of claim 15, wherein the means for detecting comprises means for simultaneously detecting the multiple peaks of the spectrum of the substance.

18. The apparatus of claim 15, wherein the means for recording comprises means for simultaneously introducing multiple pairs of reference beams in the volume holographic medium.

19. The apparatus of claim 15, wherein the means for recording comprises means for sequentially introducing multiple pairs of reference beams in the volume holographic medium.

20. The apparatus of claim 19, wherein the means for sequentially introducing comprises:
    means for providing a desired spectral filtering function for the spectrum of the substance;
    means for breaking upon the spectrum of the substance into a sequence of peaks of varying amplitude and width; and
    means for recording a separate grating in the volume holographic medium for each of the peaks.

21. The apparatus of claim 15, wherein the volume holographic medium is used as a filter in a spectroscopy apparatus.

* * * * *